C. MARSH, 2d.
Cotton-Scrapers.
No. 134,080.
Patented Dec. 17, 1872.
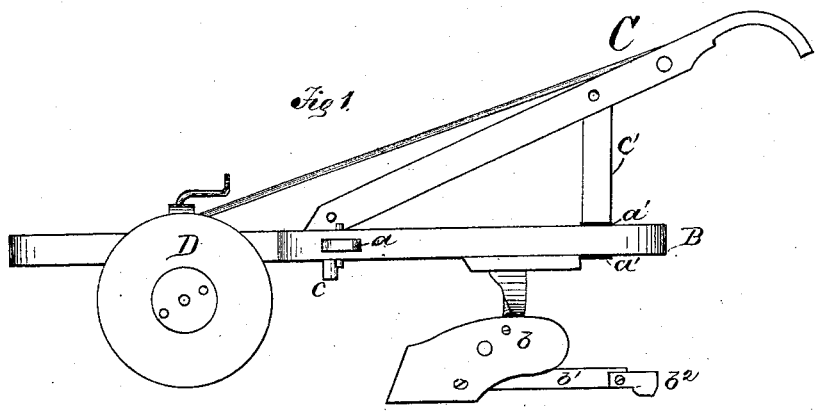
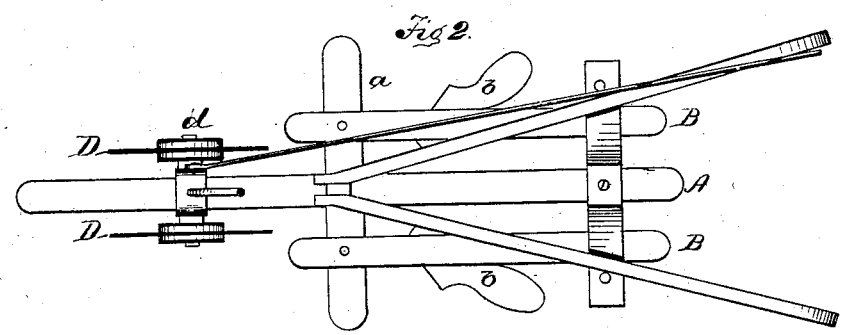
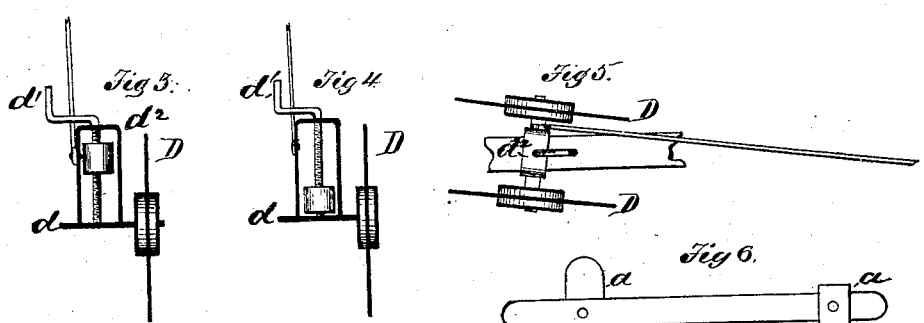

UNITED STATES PATENT OFFICE.

CYRUS MARSH, 2D, OF NATCHEZ, MISSISSIPPI.

IMPROVEMENT IN COTTON-SCRAPERS.

Specification forming part of Letters Patent No. 134,080, dated December 17, 1872.

*To all whom it may concern:*

Be it known that I, CYRUS MARSH, 2d, of Natchez, in the county of Adams and State of Mississippi, have invented a new and useful Improvement on Double Cotton-Scrapers; and I do hereby declare that the following is a full and exact description of the same, reference being had to the accompanying drawing and to the letters of reference marked thereon.

This invention is designed especially for use in the cultivation of cotton where the land lies well and is free from stumps; and consists, mainly, in the combination of guiding mechanism of peculiar construction with a frame having scraper-blades attached thereto with guiding heel-plates, as will be fully described hereinafter.

In the drawing, Figure 1 represents a side elevation of my improved machine; Fig. 2, a plan view of the same; Figs. 3, 4, and 5, views of the guiding-wheels in different positions; and Fig. 6, a plan view, showing the adjustability of the side beams.

To enable others skilled in the art to make and use my invention, I will now proceed to describe fully its construction and operation.

A represents the main beam of the machine, to which is rigidly attached in any suitable manner the cross-beam $a$ in front, and bars $a'$ $a'$ in rear. B B represent the side beams, which are laterally adjustable, as shown in Fig. 6. To these beams B are secured, by means of any suitable standards, the scraper-blades $b$ $b$, as shown. $b^1$ represents a rearwardly-extending bar attached to the lower end of the standard, to the rear end of which is attached the heel-plate $b^2$, as shown in Fig. 1.

The arrangement of the scraper-blades is not here particularly described, because this feature will be made the subject of another application.

C C represent the handles, secured in front to the main beam of the frame by a pivot-pin, $c$, and toward the rear by the V-shaped iron bar $c'$, as shown in Figs. 1 and 2. D D represent the guiding-wheels, secured in any suitable manner to the axle $d$, which is supported by the screw-rod $d^1$, turning in a threaded socket in the main beam A, as shown in Figs. 3 and 4. $d^2$ represents a clevis attached to the axle and surrounding the beam, the upper part of which furnishes a bearing for the upper end of the screw-rod $d^1$, as shown. E represents a guiding-handle, the front end of which is attached to one side of the clevis, as shown in Figs. 2, 3, 4, and 5. It extends rearward within convenient reach of the person using the machine.

The operation of my improved machine is as follows: It is drawn across the field in the usual manner, the scraper-blades operating to scrape each side of the row perfectly at one operation.

The wheels are readily adjusted in height by means of the screw-rod $d^1$, and being sharp they penetrate the ground easily, and serve to guide the machine accurately in any desired direction. The heel-plates in rear serve to hold the scraper-blades securely and prevent any sliding motion.

By means of the handle E the machine may be guided readily from the rear.

The main handles are only used to draw back the machine and turn it round at the end of the row.

By the employment of the sharp wheels in front and the heel-plates in rear, the machine runs steadily and can be guided with great accuracy.

Having thus fully described my invention, what I claim as new, and desire to secure by Letters Patent, is—

1. In a machine of substantially the described construction, the combination of sharp guiding-wheels in front, with guiding heel-plates in rear, substantially as described.

2. The combination, in a single machine, of guiding and elevating mechanism, substantially as described, the frame and a pair of scraper-blades having heel-plates attached thereto, all substantially as described, for the purpose set forth.

This specification signed and witnessed this 19th day of September, 1872.

C. MARSH, 2D.

Witnesses:
 H. P. BARLOW,
 W. S. ROTRAMEL.